(12) United States Patent
Tai

(10) Patent No.: US 6,457,672 B1
(45) Date of Patent: Oct. 1, 2002

(54) PROPULSION NACELLE ALIGNMENT SYSTEM FOR TILT-ROTOR AIRCRAFT

(75) Inventor: Tsze C. Tai, Potomac, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/929,087

(22) Filed: Aug. 15, 2001

(51) Int. Cl.[7] ............................................... B64C 17/00
(52) U.S. Cl. ......................... 244/56; 244/76 R; 244/66; 244/130; 244/7 R
(58) Field of Search ............................ 244/130, 54, 56, 244/66, 51, 52, 6, 7 R, 7 C, 76 R

(56) References Cited

U.S. PATENT DOCUMENTS

| | | | | | |
|---|---|---|---|---|---|
| RE19,932 E | * | 4/1936 | Bolas | ........................... | 244/56 |
| 2,176,476 A | * | 10/1939 | Twining | ....................... | 344/51 |
| 3,439,888 A | * | 4/1969 | Dancik | .......................... | 244/56 |
| 5,597,137 A | * | 1/1997 | Skoglun | ....................... | 244/66 |
| 5,839,691 A | * | 11/1998 | Lariviere | ..................... | 244/56 |
| 6,224,012 B1 | * | 5/2001 | Wooley | ........................ | 244/56 |
| 6,276,633 B1 | * | 8/2001 | Balayn et al. | ................. | 244/56 |

* cited by examiner

Primary Examiner—Galen L. Barefoot
(74) Attorney, Agent, or Firm—Jacob Shuster

(57) ABSTRACT

The propulsion nacelles of a tilt-rotor type aircraft are adjustably positioned on the aircraft wings under control of a programmed actuator in response to error signals produced by change in angle of attack between the aircraft fuselage and the air stream to minimize drag imposed on the aircraft by the air stream during flight.

4 Claims, 1 Drawing Sheet

PROPULSION NACELLE ALIGNMENT SYSTEM FOR TILT-ROTOR AIRCRAFT

The present invention relates generally to angular adjustment of a propulsion nacelle on a tilt-rotor aircraft for reducing drag under flight conditions.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

During flight of an aircraft, the aerodynamic forces exerted thereon include both lift and drag components. Under cruise flight conditions, lift is produced by aircraft propulsion maintained at a small angle of attack with a certain degree of drag overcome by engine thrust directly related to fuel consumption. On conventional fixed wing aircraft, the nacelles through which propulsion is imparted to the aircraft form part of the aircraft configuration subject to drag during flight under control of movable surfaces on the wings and tail. During aircraft climb, there is an increase in the angle of attack between the air stream and the aircraft fuselage, as well as other aircraft components such as the wings and nacelles, causing an increase in both lift and drag. Such increase in drag results in a costly consumption of energy. It is therefore an important object of the present invention to minimize and/or reduce such increase in drag on the aircraft without excessively costly configurational adjustment of the aircraft.

SUMMARY OF THE INVENTION

In accordance with the present invention, pitch orientation control is utilized to provide for angular adjustment of the propulsion nacelles on the fixed wings of a tilt-rotor type aircraft, so as to reduce and minimize drag under flight conditions involving increasing angle of attack between the aircraft and the air stream, without otherwise adversely affecting aircraft operation or requiring costly adjustments. Toward that end, an orientation sensor at the forward end of the aircraft detects angular deviation of the aircraft body from the flow direction of the air stream to generate an error signal is applied through an attitude gyro, to a programmed controller, to which a reference cruise signal input is also applied reflecting a constant angular deviation between the nacelles and the aircraft fuselage. A drive signal output of such controller is fed to an actuator through which the nacelle is angularly adjusted during appropriate flight conditions in accordance with programming of the controller to reduce drag by minimizing the orientation angle between the nacelle centerline and the aircraft body axis.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
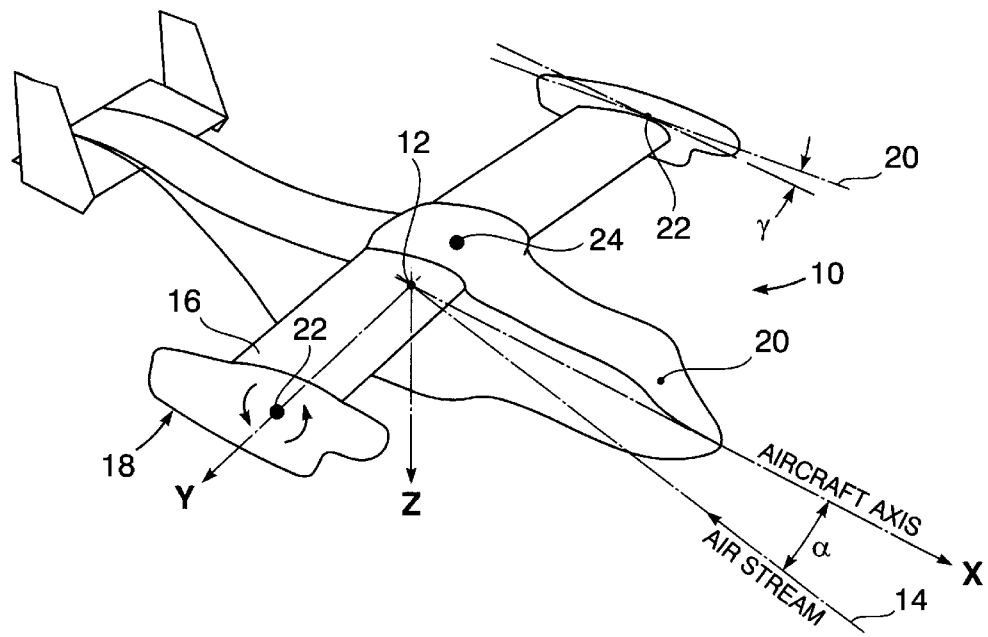
FIG. 1 is a simplified perspective view of a tilt-rotor aircraft during flight, with components of a nacelle alignment system located therein pursuant to the present invention.

Referring now to the drawing in detail, FIG. 1 illustrates the general configuration of an aircraft 10 during flight, such as a V-22 tilt-rotor type of aircraft with which the present invention is associated as hereinafter described. As shown in FIG. 1, the axis (X) of the aircraft body which extends through its center of gravity 12, is at some angle of attack ($\alpha$) to the changing direction of the air stream along a wind axis 14 during flight of the aircraft 10. Intersecting the aircraft body axis (X) at the center of gravity 12 is an axis (Y) extending perpendicular thereto laterally through fixed aircraft wings 16 having a pair of jet propulsion nacelles 18 at their outer ends. Also, a vertical axis (Z) extends perpendicular to the axes (X) and (Y) from their intersection at 12, along which the normal force that produces lift is imposed on the aircraft 10.

With continued reference to FIG. 1, each of the propulsion nacelles 18 has a centerline 20 which ordinarily deviates from the aircraft body axis (X) by a constant angle ($\gamma$) when the nacelles 18 are fixedly attached to their wings 16. Pursuant to the present invention however, tilt-axis gearboxes 22 at locations diagrammed in FIG. 1, adjustably position the nacelles 18 on the wings 16 for angular adjustment relative to the aircraft body axis (X) during directional change of the air stream wind axis 14 so that a variable alignment orientation angle ($\theta$) is established between the nacelle centerline 20 and the air stream axis 14. Such orientation angle ($\theta$) is defined in terms of the constant deviation angle ($\gamma$) and the angle of attack ($\alpha$) as: $\theta = \alpha + \gamma$. Automatic angular adjustment of the orientation angle ($\theta$) for each of the nacelles 18 is effected through the tilt-axis gear boxes 22 by a tilt actuator 24, which may be of a well known hydraulic type, centrally located within the aircraft fuselage as diagrammed in FIG. 1. Control over such actuator 24 is performed by an automatic alignment system 26 as diagrammed in FIG. 2, which includes an attitude signal converting gyro 28 and an orientation (alpha) sensor 30 at locations as diagrammed in FIG. 1.

Figure 2:
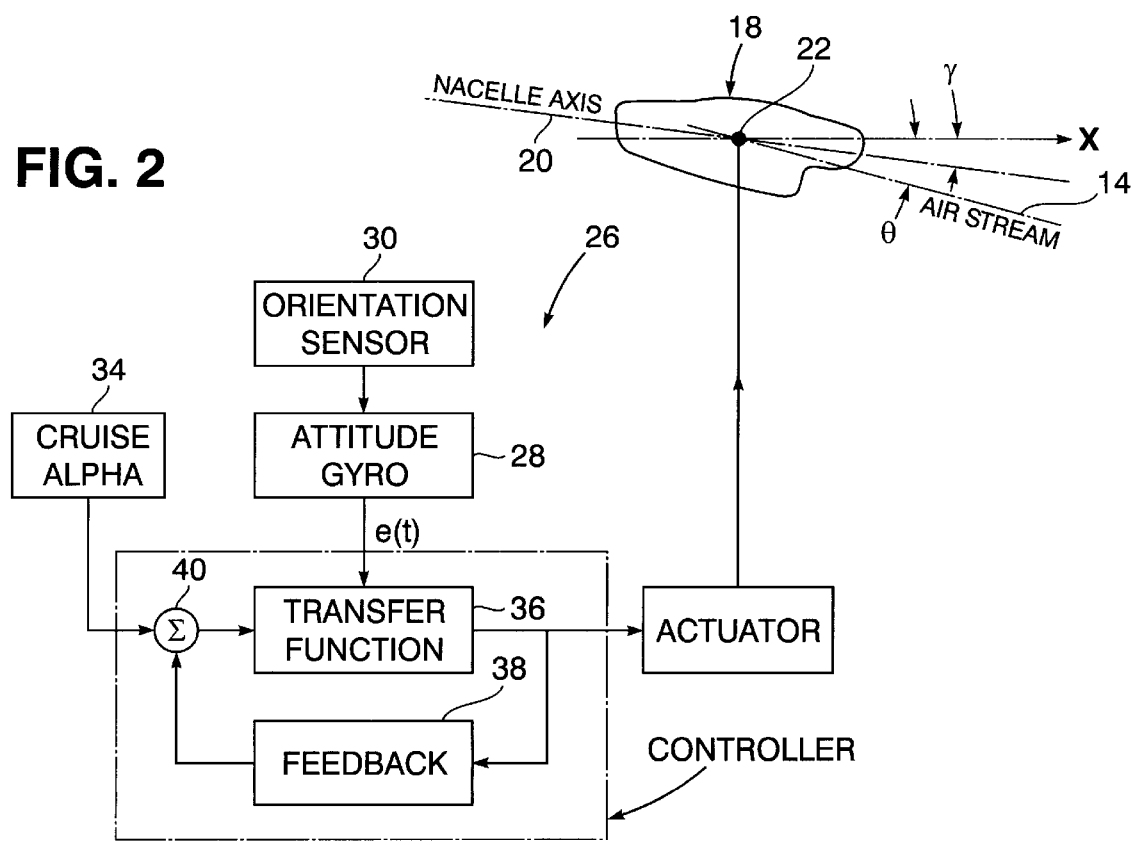
FIG. 2 is a block diagram of the nacelle alignment system in association with one of the nacelles illustrated in FIG. 1.

Referring now to FIG. 2, the arrangement of the actuator, attitude gyro and orientation sensor components 24, 28 and 30, forming the alignment system 26, is diagrammed. Also associated with the system 26 is a programmed controller 32 to which the actuator 24 is connected in order to adjustably vary the alignment angle ($\theta$). Such controller 32 receives error signals from the attitude gyro 28 and a reference signal input from a cruise alpha device 34 reflecting the constant alpha ($\alpha$) angle between the aircraft fuselage axis (X) and the air stream wind flow axis 14. Thus, changes in the angle of attack ($\alpha$) are detected by the sensor 30 to feed corresponding output signals to the attitude gyro 28 for conversion of the changes in angle of attack ($\alpha$) to the error signals fed to the controller 32, which also receives its initial reference input signal on the deviation angle ($\gamma$) from the cruise alpha device 34, in order to vary the alignment orientation angle ($\theta$) during appropriate flight conditions as aforementioned in accordance with programming software associated therewith.

With continued reference to FIG. 2, the software arrangement associated with the controller 24 includes a transfer function component 36 to which the error signal e(t) generated by the attitude gyro 28 is applied in order to produce a variable output applied to the actuator 24. A feedback portion of the transfer function output is transferred to a feedback transfer component 38 for feedback processing of the signal transmitted in the transfer function component 36 with the reference input r(t) from the cruise alpha component 34 by means of a component 40 from which a feedback processing signal is fed to the forward transfer function component 36 so as to modify its drive output to the actuator 24. Thus, the stability of the alignment system 26 and the properties of its dynamic closed-loop modes are determined from the characteristic equation: $1+G(s)H(s)-0$, where $G(s)$ is the forward path transfer function of the component 36 and $H(s)$ is the feedback path transfer function of the component 38.

The foregoing described arrangement of the nacelle alignment system 26 controls angular adjustment of the nacelles 18 so as to minimize deviation from the direction of the air stream only during certain flight conditions of the aircraft 10 under some angle of attack ($\alpha$) to thereby reduce the amount of nacelle drag such as 10 to 15 percent in the tilt-rotor type aircraft 10. Toward that end, the sensor 30 at the forward end of the aircraft 10 detects the magnitude of angular deviation of the nacelle centerline 20 from the airflow direction 14 to produce a corresponding error signal through the attitude gyro 28 applied to the controller 32 for activation thereof from an inactive standby state under computer programming during normal cruise flight or take-off when the aircraft fuselage and wings are at a relatively high angle of attack ($\alpha$). By reducing the orientation angle ($\theta$) under such flight conditions with respect to the nacelles 18 through the actuator 24, drag reduction was achieved to a substantial degree for the nacelles 18, such as 10 to 15 percent with a total drag reduction of up to 4.5 percent for the entire aircraft 10. Such drag reduction amounts to a decrease of 2 to 3 percent for example in engine thrust requirement so as to correspondingly reduce fuel consumption during flight of the aircraft 10. Such corrective angular adjustment of the nacelles 18 is effected through the actuators 24, which may be of any well known type such as a hydraulic actuator having a spool valve and a hydraulic ram through which rotation is imparted to the nacelle 18 about its centerline 20.

Although the nacelle alignment system 26 as hereinbefore described was applied to a particular type of tilt-rotor aircraft 10, it may also be applicable to other types of aircraft to only adjust positioning of the propulsion nacelles, involving a corresponding modification of the sensor 30 and control system 26 so as to achieve similar fuel saving results by reducing drag under certain appropriate flight conditions.

Obviously, other modifications and variations of the present invention may be possible in light of the foregoing teachings. It is therefore to be understood that within the scope of the appended claims the invention may be practiced otherwise than as specifically described.

What is claimed is:

1. In combination with an aircraft having a propulsion nacelle subjected to drag during flight at an angle of attack between the aircraft and a resulting air stream flow; an alignment control system for adjustably positioning the nacelle, comprising: sensor means on the aircraft for detection of changes in orientation of the aircraft relative to said air stream flow; attitude converter means connected to the sensor means for generating an error signal in response to said detection of the changes in orientation by the sensor means; and controller means connected to said attitude converter means for regulating said positioning of the nacelle on the aircraft as a function of the error signal to minimize the drag imposed thereon during said flight.

2. The alignment control system as defined in claim 1, wherein the controller means includes: transfer function means for processing said error signal into an actuator drive signal through which said positioning of the nacelle is effected; cruise signal means for generating a reference signal reflecting a constant angular deviation in direction between said flight of the aircraft and the air stream flow; and feedback means responsive to said actuator drive signal and said reference signal for processing of the error signal from which the actuator drive signal is derived.

3. In combination with an aircraft having a propulsion nacelle subjected to drag during flight at an angle of attack between the aircraft and a resulting air stream flow; a method of controlling angular positioning of the nacelle on the aircraft to minimize drag imposed thereon during said flight, comprising the steps of: detecting changes in orientation of the aircraft relative to said air stream flow; and adjusting said angular positioning of the nacelle on the aircraft as a function of said change in the orientation.

4. The combination as defined in claim 3, wherein the aircraft has a fuselage with fixed wings on which said propulsion nacelle is adjustably positioned; the change in orientation being detected at a forward end of the fuselage.

* * * * *